June 14, 1960

G. W. HOBBS 2,940,669

RADIX CONVERTER

Filed March 10, 1954

5 Sheets-Sheet 1

Inventor:
George W. Hobbs,
by [signature]
His Attorney.

June 14, 1960 G. W. HOBBS 2,940,669

RADIX CONVERTER

Filed March 10, 1954 5 Sheets-Sheet 2

Inventor:
George W. Hobbs,
by
His Attorney.

Inventor:
George W. Hobbs,
by [signature]
His Attorney.

June 14, 1960 G. W. HOBBS 2,940,669

RADIX CONVERTER

Filed March 10, 1954 5 Sheets-Sheet 4

Inventor:
George W. Hobbs,
by [signature]
His Attorney.

June 14, 1960 G. W. HOBBS 2,940,669

RADIX CONVERTER

Filed March 10, 1954 5 Sheets-Sheet 5

Inventor:
George W. Hobbs,
by [signature]
His Attorney.

United States Patent Office 2,940,669
Patented June 14, 1960

2,940,669

RADIX CONVERTER

George W. Hobbs, Scotia, N.Y., assignor to General Electric Company, a corporation of New York Filed Mar. 10, 1954, Ser. No. 415,286
17 Claims. (Cl. 235—155)

Figure 1:
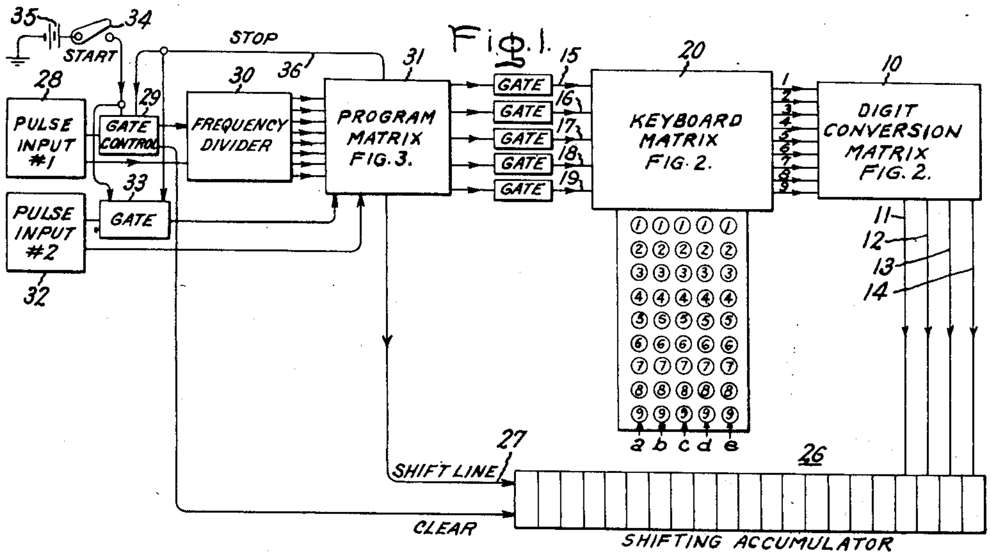

This invention generally relates to number radix translating systems, and more particularly to systems for converting numbers expressed in decimal notation to that of binary notation for purposes of computation or the like.

With the ever increasing reliance being placed upon digital calculating machines to solve longer and more complex mathematical problems has resulted the evolution of calculators of immense size having many thousands of parts and consuming tremendous quantities of power. Various means of simplifying the numerous and diversified arithmetic processes performed by these machines have long been sought, and it has been previously determined that the circuitry for performing these arithmetic functions may be greatly simplified in many instances by performing computations in the binary number system rather than in the decimal or other number system.

The representation of a number in binary notation, however, has the disadvantage of requiring more than three times as many digits as the representation of the same number in decimal notation. This fact coupled with the general familiarity in dealing with numbers in decimal form, makes it more desirable and expedient for the human operator to initially enter the problem in decimal form into the machine and provide a means within the machine itself for converting this number into binary notation prior to performing the calculating functions. Such means have been termed by those skilled in the art as radix converters and where the numbered data in decimal form is converted into binary form, as decimal to binary converters.

The present invention provides such a converter for a high speed calculating device wherein numbers conventionally represented in decimal notation may be both automatically and instantaneously converted into binary notation. In accordance with the present invention, a multi-digit number represented in conventional decimal form is initially stored in the device by means of a manually operated keyboard, punched card, or the like. Thereafter, in a series of sequential operations, each digit of this multi-order decimal number is individually converted into its binary-coded form and individually entered into a summing accumulator in additive relation with the other binary-coded digits. Upon the completion of these sequential operations, the resulting summation standing in the accumulator constitutes the binary number form of the original decimally represented number. Since the various digits of the decimal number actually represent the product of that decimal digit and one of the various powers of the decimal radix such as 10, 100, 1,000, 10,000, etc., dependent upon the notative position of this digit in the multi-order decimal number, the present invention incorporates means for entering each binary-coded digit into the proper stages of the binary accumulator by a process of shifting the binary-coded digits either before or after entry, thereby enabling this resulting summation to equal the actual binary equivalent of the original number.

It is accordingly one object of this invention to provide a high speed device for converting a number expressed in radix 10 to radix 2.

A further object is to provide a high speed digitally operating decimal to binary converter having no moving parts.

A still further object is to provide an improved device for translating a number expressed in one radix to that of another.

Figure 4:
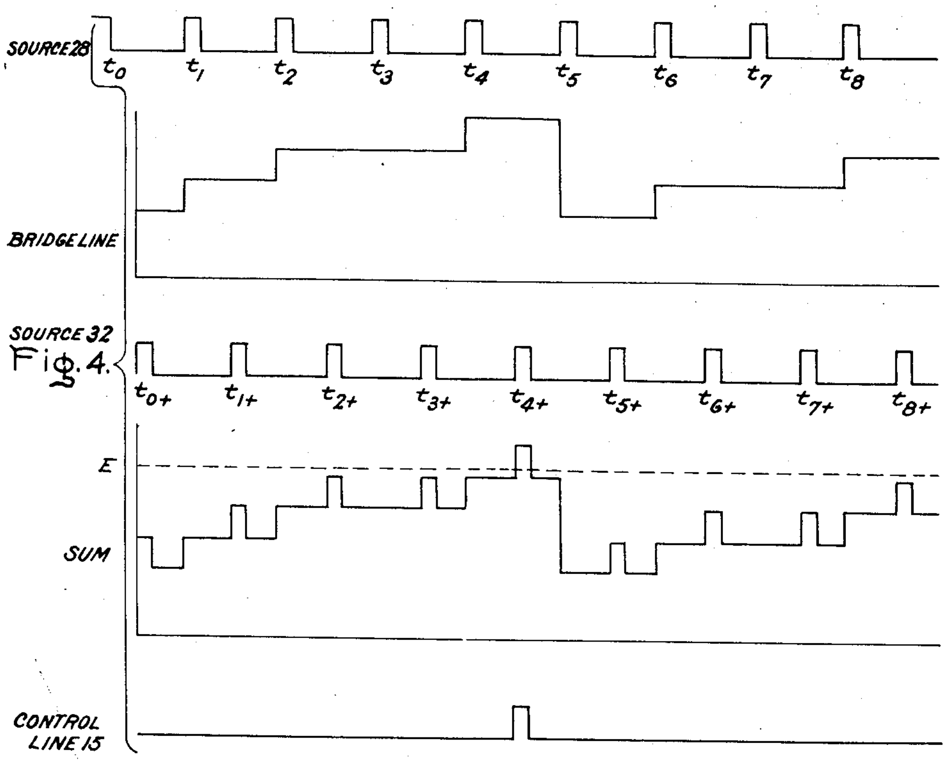
Figure 2:
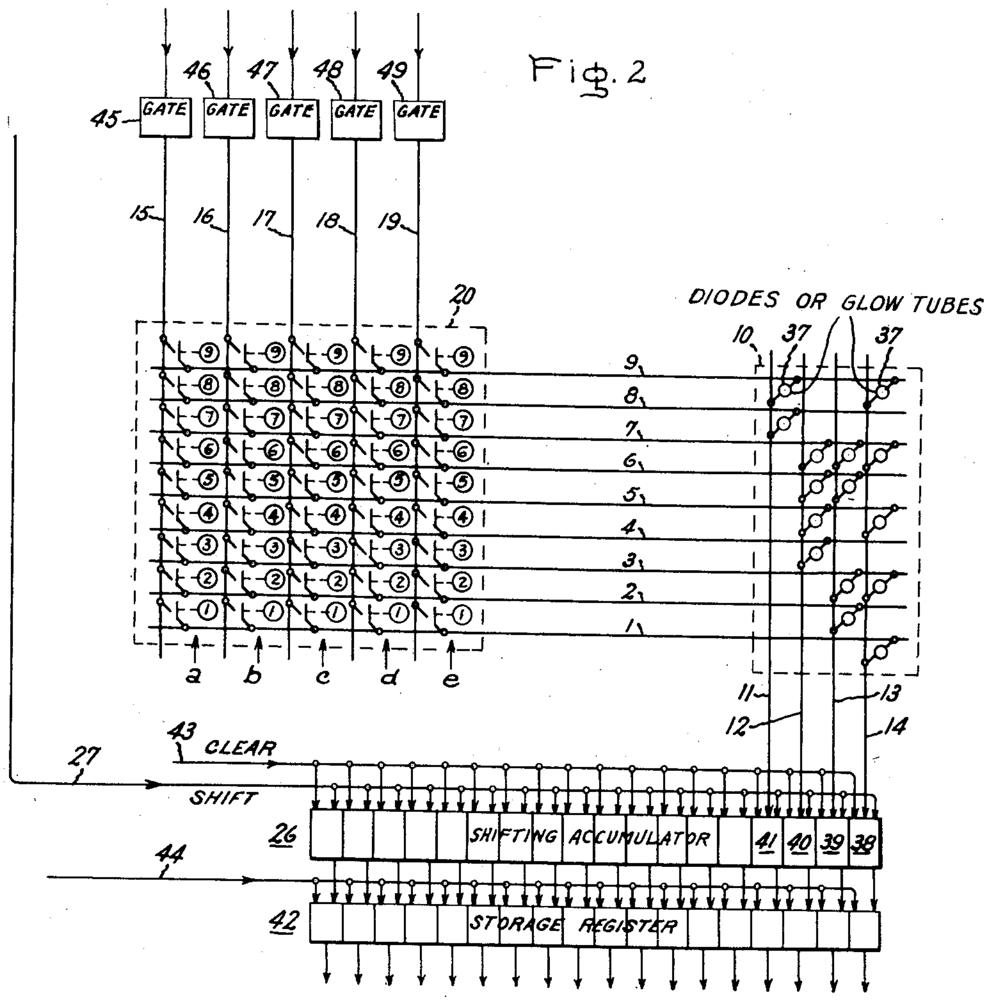
Figure 3:
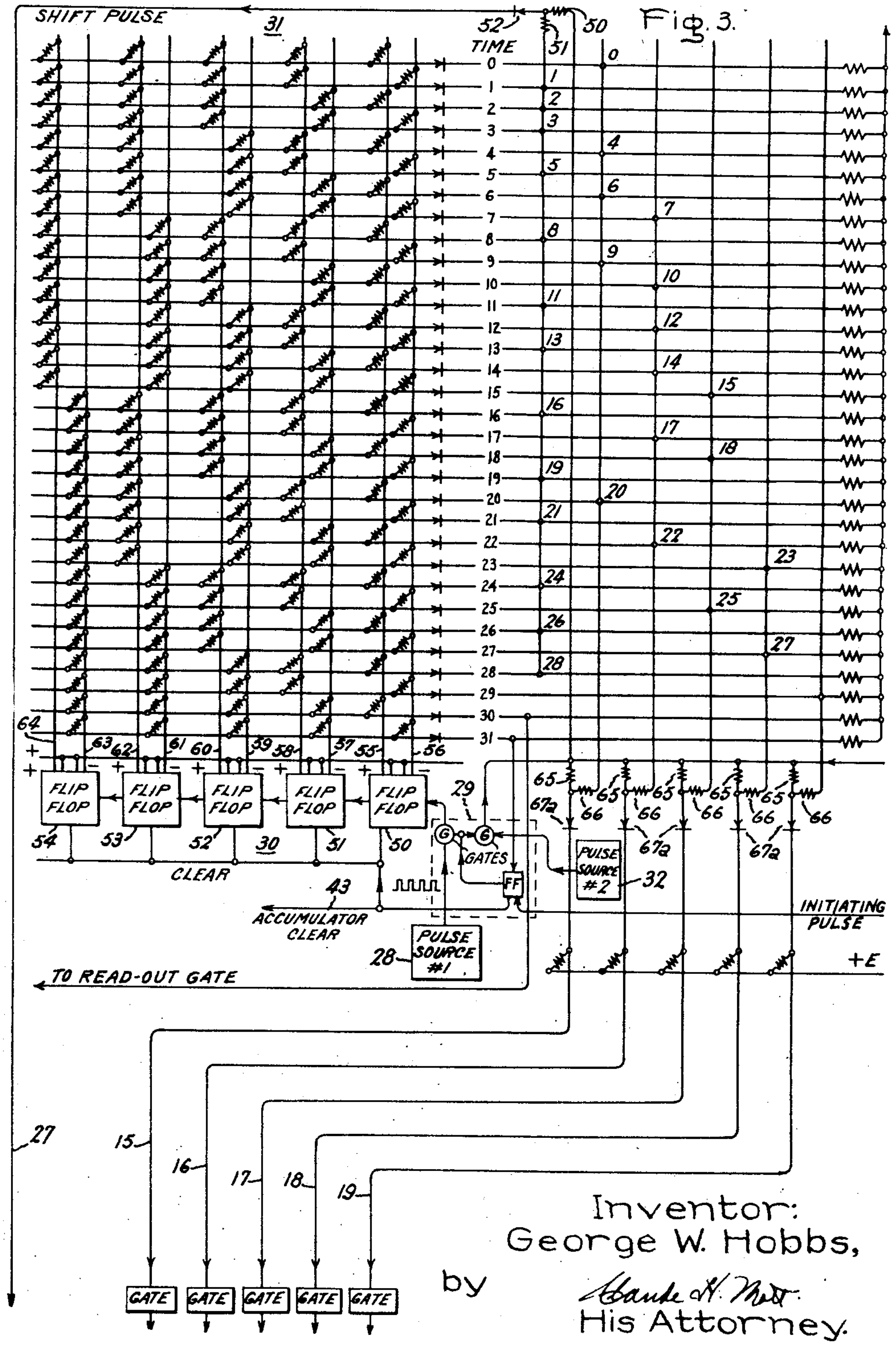
Figure 5:
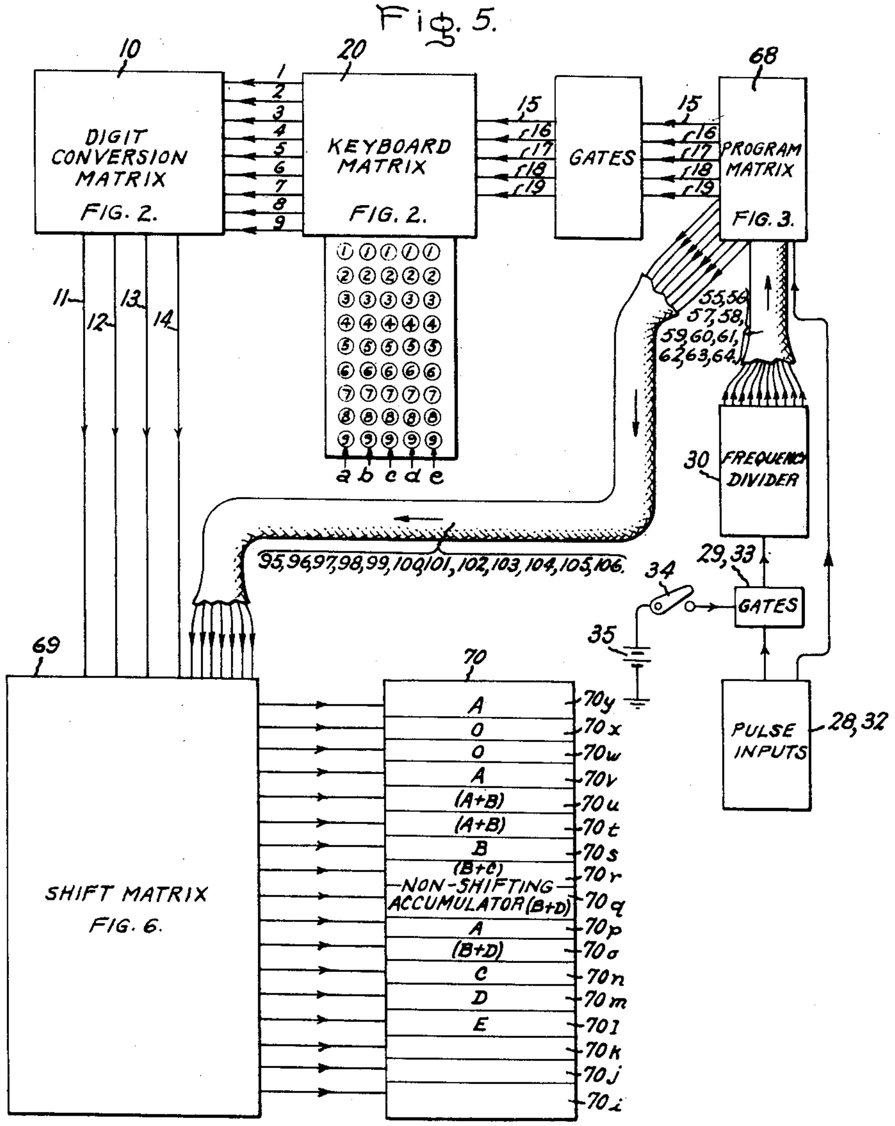
Figure 6:
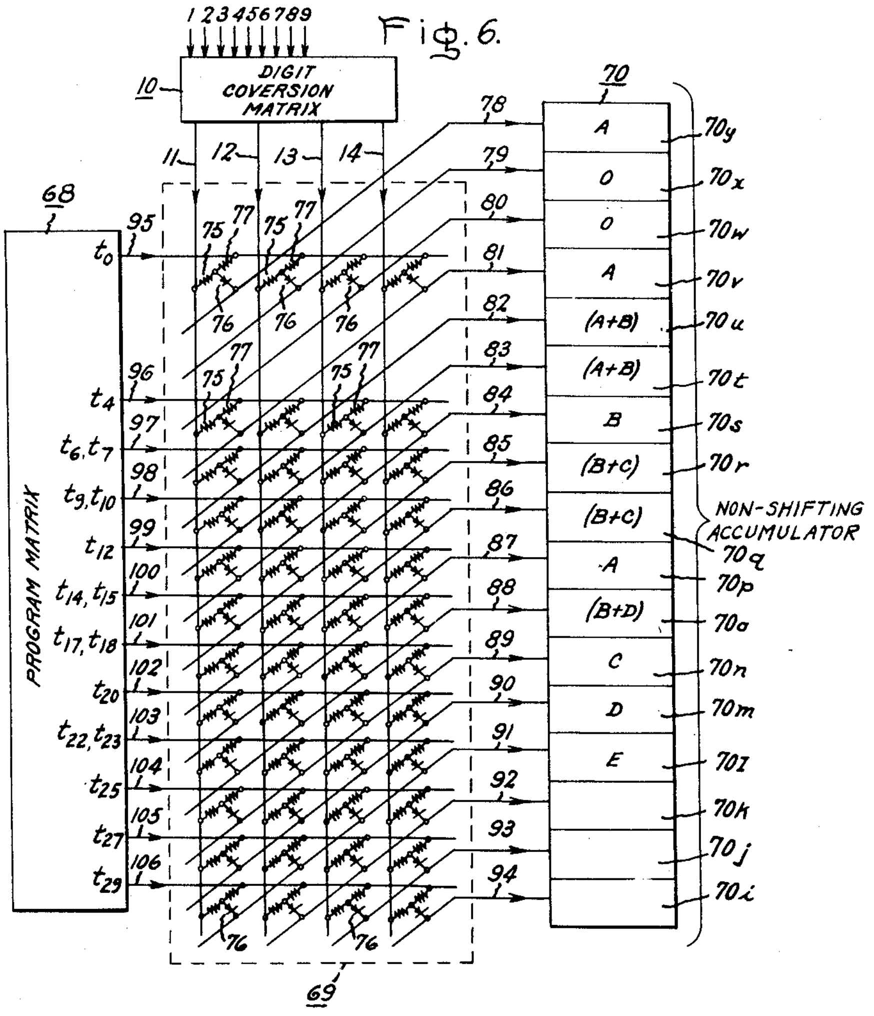

Other objects and many attendant advantages of this invention will be more readily comprehended to those skilled in this art upon a consideration of the following detailed description of preferred embodiments of the invention taken in conjunction with the accompanying drawings wherein:

Fig. 1 functionally illustrates one preferred embodiment of the invention, in block diagram form, Figs. 2 and 3 schematically illustrate preferred circuitry employed in this embodiment, Fig. 4 is a pulse waveform diagram depicting the time relation of the programming pulses generated by the circuitry of Fig. 3, Fig. 5 is a block diagram functionally illustrating a second embodiment of the invention, and Fig. 6 is an electrical diagram, partially in schematic form, depicting the additional circuitry of Fig. 5.

Prior to commencing the detailed description of the preferred embodiments of the invention, a more thorough comprehension thereof may be had by initially considering the mathematical basis for the operations performed. Considering that any five digit decimal number $a\ b\ c\ d\ e$ may be expressed as the sum of the following four products and a decimal digit $e$:

$$(a\times 10^4)+(b\times 10^3)+(c\times 10^2)+(d\times 10^1)+e$$

The binary equivalent of this number may be found by initially determining the binary equivalent of each above product and that of decimal digit $e$, and thereafter summing these five binary numbers. Similarly, the binary equivalent of each above product may be obtained by determining the binary equivalent of each of the digits $a$, $b$, $c$, $d$, and $e$, and thereafter multiplying these binary numbers by the binary equivalent of its associated integral 10's multiple number; that is, multiplying the binary equivalent of $a$ by the binary equivalent of $10^4$ or 10,000; multiplying the binary equivalent of $b$ by the binary equivalent of $10^3$ or 1,000, and so forth.

Inasmuch as the binary equivalent of each above integral 10's multiple number is known as follows:

| Decimal: | Binary |
|---|---|
| $10^0$—1 | 1 |
| $10^1$—10 | 1010 |
| $10^2$—100 | 1100100 |
| $10^3$—1000 | 1111101000 |
| $10^4$—10000 | 10011100010000 |

this process may be mathematically represented by allowing the capital letters A, B, C, D, and E to represent the binary-coded form of each of the decimal digits $a$, $b$, $c$, $d$, and $e$, respectively:

$$(A\times 10011100010000)+(B\times 1111101000)+(C\times 1100100)+(D\times 1010)+(E\times 1)$$

Since the only quantities that vary for each number conversion operation are the numerical values of the decimal digits $a$, $b$, $c$, $d$, and $e$, the resulting binary equivalent number may be expressed in terms of the binary-coded form of these unknowns as follows:

$$(A00AAA000A0000)+(BBBBB0B000)+(CC00C00)+(D0D0)+E$$

And by adding these terms as:

$$A00A(A+B)(A+B)B(B+C)(B+C)A(B+D)CDE$$

Thus, any five digit decimal number *a, b, c, d, e* may be represented in binary form as $$A00A(A+B)(A+B)B(B+C)(B+C)A(B+D)CDE$$

where this later association of binary-coded digits mathematically represents the ordinal position of these digits or as mathematically expressed equals:

$$A\times 2^{13}+0\times 2^{12}+0\times 2^{11}+A\times 2^{10}+(A+B)\times 2^{9} +(A+B)\times 2^{8}+B\times 2^{7}+(B+C)\times 2^{6}+(B+C)\times 2^{5} +A\times 2^{4}+(B+D)\times 2^{3}+C\times 2^{2}+D\times 2^{1}+E\times 2^{0}$$

just as the association of decimal digits *a, b, c, d, e* may be mathematically expressed as:

$$a\times 10^{4}+b\times 10^{3}+c\times 10^{2}+d\times 10^{1}+e\times 10^{0}$$

To convert the decimal number *a, b, c, d,* and *e,* to its binary form in accordance with the above mathematically illustrated process, therefore, each of these decimal digits *a, b, c, d, e* may be individually converted into their binary-coded form A, B, C, D, and E, respectively, and thereafter each of these binary digits may be individually shifted and entered into various ordinal stages of a summing accumulator in accordance with the above designated physical arrangement or may be individually entered in the accumulator and thereafter shifted to the desired stages thereof as will be more fully comprehended hereinafter.

SYSTEM BLOCK DIAGRAM

*Fig. 1*

Referring now to the block diagram of Fig. 1 for an overall consideration of one preferred embodiment of the present invention operating in accordance with this mathematical process, a decimal to binary digit converter 10, represented by the block labeled digit conversion matrix, generates the binary-coded form of any of the decimal digits 1–9, inclusive, over the four output lines numbered 11, 12, 13, and 14, in response to energization of a corresponding one of the nine numbered input lines entering therein. That is, energizing input line number 1 by an impulse results in a pulse being generated over output line 14, representing the binary-coded form of decimal number 1 or (0001); similarly, energizing input line 2 results in a pulse being generated over output line 13 connected thereto, representing the binary-coded form of decimal number 2 or (0010), or energizing line numbered 3 results in output pulses being generated over both lines 13 and 14, designating the binary-coded form of decimal number 3 or (0011), and so forth.

A plurality of control lines 15, 16, 17, 18, and 19, one for each denominational order of the decimal number to be converted, are connected to carry impulses to the digit conversion matrix for sequentially converting each digit of the decimal number to its binary-coded form. Consequently, a pulse directed over control line 15 passes through keyboard 20 to the digit conversion matrix 10 resulting in the highest order decimal digit, *a*, being converted into its binary-coded form A, and a plurality of pulses representing A, being generated over output lines 11, 12, 13, and 14. Similarly, pulses directed over the remaining four control lines 16, 17, 18, and 19 pass through keyboard 20 to the digit conversion matrix 10 resulting in the lesser order decimal digits *b, c, d,* and *e,* respectively, being converted into their binary-coded forms B, C, D, and E, and impulses representing these binary-coded numbers being generated over output matrix lines 11, 12, 13, and 14 to the first four stages of accumulator 26.

For connecting each of these control lines to the desired input line of matrix 10 corresponding to the decimal digit of that order to be converted, a keyboard matrix generally designated by the block numbered 20 is provided intermediate the control lines and the input lines to the digit conversion unit 10. This keyboard unit 20 preferably comprises a series of vertical rows of switches labeled *a, b, c, d,* and *e,* one row for each order of the decimal number to be converted. Each of these rows *a, b, c, d,* and *e,* comprise a plurality of switches numbered 1–9, inclusive, having one terminal of each switch connected in common to a corresponding one of the control lines 15, 16, 17, 18, or 19 and the other terminal thereof connected to a correspondingly numbered one of the nine input lines of the digit conversion unit 10. Thus, for example, should the keyboard digits 6, 3, 8, 5, 0, be depressed, entering the decimal number 63850 into the system, control line 15 is connected through switch 6 of keyboard row *a* to the sixth input line of digit conversion unit 10; control line 16 is connected through switch 3 of keyboard row *b* to the third input line of digit conversion unit 10; control line 17 is connected through depressed switch 8 of keyboard row *c* to the eighth input line of digit conversion unit 10; and control line 18 is connected through depressed switch 5 of keyboard column *d* to the fifth input line of digit conversion unit 10. Consequently, for each energization of control line 15, the binary-coded form of decimal digit 6 is generated by digit conversion unit 10; for each energization of control line 16, the binary-coded form of decimal digit 3 is generated by digit conversion unit 10; for each energization of control line 17, the binary-coded form of decimal digit 8 is generated by digit conversion unit 10; and for each energization of control line 18, the binary-coded form of decimal digit 5 is generated by digit conversion matrix 10.

Thus, the combination of the separate control lines 15, 16, 17, 18, and 19, the keyboard matrix 20, and the digit conversion matrix 10 provide the means for individually generating the binary-coded form of any of the decimal digits *a, b, c, d,* and *e,* where each of these digits may comprise any of the decimal numbers 1–9, inclusive, that may be entered into the keyboard.

For summing each of these binary-coded digits generated as a series of pulses over lines 11, 12, 13, and 14, by digit conversion unit 10, a multi-stage shifting accumulator 26 is provided having the inputs of the first four stages thereof connected to additively receive each of the binary-coded numbers. Accumulator 26 includes a plurality of cascaded binary counting stages, each stage having a separate input and adapted to sum two pulses and after receiving the second pulse to generate a carry-over pulse to the next succeeding stage. The individual stages of this accumulator are additionally interconnected by circuitry for receiving a shift or transfer pulse over line 27 operating upon all of these stages simultaneously to transfer the count of each stage to the next succeeding stage. Upon receiving each shift pulse over line 27, therefore, the binary number then standing in the accumulator is bodily shifted to the left, assuming the next succeeding ordinal position in the accumulator stages.

The remainder of the system illustrated in the left of the figure generally comprises programming control circuitry for directing impulses over each of the control lines 15, 16, 17, 18, and 19, and the control shift line 27 in a step-by-step predetermined sequence to individually convert each of the decimal digits *a, b, c, d,* and *e* into its binary-coded form A, B, C, D, and E, respectively, and to individually and collectively shift these binary-coded digits in the accumulator to assume the predetermined ordinal positions mathematically represented above as:

$$A00A(A+B)(A+B)B(B+C)(B+C)A(B+D)CDE$$

To facilitate an understanding of this programming system initiating the various operations wherein each digit is individually converted to its binary-coded form and shifted to the above designated prearranged ordinal position in the accumulator stages, reference is now made to

CHART I

| Time | Operation | Action | Accumulator Reading |
|---|---|---|---|
| $t_0$ | Pulse Line 15 | Add A | A |
| $t_1$ | Pulse Shift Line 27 | Shift Accumulator | A0 |
| $t_2$ | Pulse Shift Line 27 | Shift Accumulator | A00 |
| $t_3$ | Pulse Shift Line 27 | Shift Accumulator | A000 |
| $t_4$ | Pulse Line 15 | Add A | A00A |
| $t_5$ | Pulse Shift Line 27 | Shift Accumulator | A00A0 |
| $t_6$ | Pulse Line 15 | Add A | A00AA |
| $t_7$ | Pulse Line 16 | Add B | A00A(A+B) |
| $t_8$ | Pulse Shift Line 27 | Shift Accumulator | A00A(A+B)0 |
| $t_9$ | Pulse Line 15 | Add A | A00A(A+B)A |
| $t_{10}$ | Pulse Line 16 | Add B | A00A(A+B)(A+B) |
| $t_{11}$ | Pulse Shift Line 27 | Shift Accumulator | A00A(A+B)(A+B)0 |
| $t_{12}$ | Pulse Line 15 | Add B | A00A(A+B)(A+B)B |
| $t_{13}$ | Pulse Shift Line 27 | Shift Accumulator | A00A(A+B)(A+B)B0 |
| $t_{14}$ | Pulse Line 16 | Add B | A00A(A+B)(A+B)BB |
| $t_{15}$ | Pulse Line 17 | Add C | A00A(A+B)(A+B)B(B+C) |
| $t_{16}$ | Pulse Shift Line 27 | Shift Accumulator | A00A(A+B)(A+B)B(B+C)0 |
| $t_{17}$ | Pulse Line 16 | Add B | A00A(A+B)(A+B)B(B+C)B |
| $t_{18}$ | Pulse Line 17 | Add C | A00A(A+B)(A+B)B(B+C)(B+C) |
| $t_{19}$ | Pulse Shift Line 27 | Shift Accumulator | A00A(A+B)(A+B)B(B+C)(B+C)0 |
| $t_{20}$ | Pulse Line 15 | Add A | A00A(A+B)(A+B)B(B+C)(B+C)A |
| $t_{21}$ | Pulse Shift Line 27 | Shift Accumulator | A00A(A+B)(A+B)B(B+C)(B+C)A0 |
| $t_{22}$ | Pulse Line 16 | Add B | A00A(A+B)(A+B)B(B+C)(B+C)AB |
| $t_{23}$ | Pulse Line 18 | Add D | A00A(A+B)(A+B)B(B+C)(B+C)A(B+D) |
| $t_{24}$ | Pulse Shift Line 27 | Shift Accumulator | A00A(A+B)(A+B)B(B+C)(B+C)A(B+D)0 |
| $t_{25}$ | Pulse Line 17 | Add C | A00A(A+B)(A+B)B(B+C)(B+C)A(B+D)C |
| $t_{26}$ | Pulse Shift Line 27 | Shift Accumulator | A00A(A+B)(A+B)B(B+C)(B+C)A(B+D)C0 |
| $t_{27}$ | Pulse Line 18 | Add D | A00A(A+B)(A+B)B(B+C)(B+C)A(B+D)CD |
| $t_{28}$ | Pulse Shift Line 27 | Shift Accumulator | A00A(A+B)(A+B)B(B+C)(B+C)A(B+D)CD0 |
| $t_{29}$ | Pulse Line 19 | Add E | A00A(A+B)(A+B)B(B+C)(B+C)A(B+D)CDE |

the accompanying four column tabulated chart illustrating in the first column thereof, labeled "Time," the chronological time interval for each programmed operation; illustrating in the second column thereof, labeled "Operation," the function performed by the programming system at this time interval; illustrating in the third column thereof, labeled "Action," the result of this programmed function; and illustrating in the fourth column thereof, labeled "Accumulator Reading," the resulting binary number standing in the accumulator upon the completion of this operation.

For example, considering the operation occurring at time $t_0$, a pulse generated over control line 15 passes through the depressed key of column $a$ of keyboard matrix 20, thence entering the correspondingly numbered input line of digit conversion matrix 10 to generate the binary-coded form of this decimal digit, A. These binary-coded pulses are then directed to the first four stages of shifting accumulator 26 resulting in the binary number A standing in the first four stages of the accumulator. At time $t_1$, the programming circuit directs a pulse over accumulator shift line 27 and the number standing in the accumulator 26 is thereby shifted one place to the left resulting in the accumulator reading of A0. Upon completing thirty of these separate operations as indicated by the tabulated chart wherein each of the control lines 15, 16, 17, 18, and 19, and the shift line 27 are pulsed in a predetermined time sequence, it is observed that the resulting number standing in the accumulator is the desired binary equivalent of the original decimal number.

For further clarifying this manner of entering and shifting each of the binary-coded digits, a second two-column chart below is provided for illustrating this sequence of operations employing the multi-digit decimal number 63850. The first column of this chart, labeled "Time," again indicates the time interval for each operation, and the second column, labeled "Accumulator Reading," illustrates the binary number standing in the accumulator upon the completion of this operation. Thus, it is observed that at time $t_0$, binary number 110 (the binary-coded form of decimal number 6) has been entered into the accumulator. At time $t_1$, shift line 27 has been energized by the programming circuit, resulting in the shifting of 110 (the binary-coded form of decimal 6) one place to the left, and so forth. Following this chart it is observed that upon the completion of these thirty operations, as discussed above, the resulting number standing in the accumulator then constitutes the binary form of the originally entered decimal number 63850.

CHART II

| Decimal | Binary |
|---|---|
| $a=6$ | $110=A$ |
| $b=3$ | $11=B$ |
| $c=8$ | $1000=C$ |
| $d=5$ | $101=D$ |
| $e=0$ | $0=E$ |

| Time: | Accumulator reading |
|---|---|
| $t_0$ | 110 |
| $t_1$ | 1100 |
| $t_2$ | 11000 |
| $t_3$ | 110000 |
| | +110 |
| $t_4$ | 110110 |
| $t_5$ | 1101100 |
| | +110 |
| $t_6$ | 1110010 |
| | +11 |
| $t_7$ | 1110101 |
| $t_8$ | 11101010 |
| | +110 |
| $t_9$ | 11110000 |
| | +11 |
| $t_{10}$ | 11110011 |
| $t_{11}$ | 111100110 |
| | +11 |
| $t_{12}$ | 111101001 |
| $t_{13}$ | 1111010010 |
| | +11 |
| $t_{14}$ | 1111010101 |
| | +1000 |
| $t_{15}$ | 1111011101 |
| $t_{16}$ | 11110111010 |
| | +11 |
| $t_{17}$ | 11110111101 |
| | +1000 |
| $t_{18}$ | 11111000101 |
| $t_{19}$ | 111110001010 |
| | +110 |
| $t_{20}$ | 111110010000 |
| $t_{21}$ | 1111100100000 |
| | +11 |
| $t_{22}$ | 1111100100011 |
| | +101 |
| $t_{23}$ | 1111100101000 |
| $t_{24}$ | 11111001010000 |
| | +1000 |
| $t_{25}$ | 11111001011000 |
| $t_{26}$ | 111110010110000 |
| | +101 |
| $t_{27}$ | 111110010110101 |
| $t_{28}$ | 1111100101101010 |
| | +0 |
| $t_{29}$ | 1111100101101010 |

Summarizing the programming information graphically presented by these charts, the programming system at the left of the figure comprises a means for generating a predetermined sequence of pulses over the plurality of control lines and a control shift line; the pulses being generated over the various control lines as follows:

Over line 15 at times $t_0$, $t_4$, $t_6$, $t_9$, and $t_{20}$.
Over line 16 at times $t_7$, $t_{10}$, $t_{12}$, $t_{14}$, $t_{17}$, and $t_{22}$.
Over line 17 at times $t_{15}$, $t_{18}$, and $t_{25}$.
Over line 18 at times $t_{23}$, and $t_{27}$.
Over line 19 at time $t_{29}$.
Over shift line 27 being generated at times $t_1$, $t_2$, $t_3$, $t_5$, $t_8$, $t_{11}$, $t_{13}$, $t_{16}$, $t_{19}$, $t_{21}$, $t_{24}$, $t_{26}$, and $t_{28}$.

For generating these different sequences of pulses over different ones of the control lines and the shift line 27, the programming circuit comprises a pulse source, generally indicated by the box numbered 28, generating a continuous supply of recurring pulses through an electrical gating member 29 to a frequency divider circuit 30, and thence to a programming matrix circuit 31. Frequency divider 30, preferably including a plurality of cascaded binary frequency dividing stages, is supplied as a means for separating each of the incoming pulses received from pulse source 28 and directing a coded potential over a plurality of output lines representative of each pulse. This coded potential from the frequency divider, being directed to the program matrix 31, conditions this matrix for generating the desired sequence of pulses over the control lines and the shift line.

To insure that pulses are not spuriously generated by the program matrix in response to noise signals and irregularities in the supply potential, a second pulse source, generally indicated by the box 32, provides a second series of recurring pulses through a gate circuit 33 to additionally energize program matrix 31. Pulses from the second pulse source 32 are time displaced from the pulses of source #1 (28) and are coincidentally combined by the program matrix for eliminating any undesired energization of the control lines.

The overall operation of this system is then as follows: After entering each of the digits of the multi-denominational decimal number in the keyboard by depressing the correspondingly numbered keys in each row thereof, start switch 34 is closed energizing gates 29 and 33 by a source 35 to open position and enabling pulse sources 28 and 32 to repetitively direct impulses to frequently divider 30 and program matrix 31, respectively. Each of the first thirty pulses generated by source 28 are thereafter separated by the frequency divider circuit 30 into various combinations of potentials over the output lines thereof, and thence redirected by programming matrix 31 into separated pulses over different output lines in the above discussed pattern, enabling each of the thirty operations to be initiated for converting the decimal number stored in the keyboard matrix into its binary form. Upon completion of these thirty operations, the next succeeding pulse passing through this programming circuitry, indicating that the sequential conversion operations have been completed, is directed backwardly over stop line 36 to close gates 29 and 33 and reset the system for a new conversion operation.

*Detailed circuitry of the keyboard matrix and digit conversion matrix Fig. 2*

Referring now to Fig. 2 for a detailed consideration of preferred circuitry for the digit conversion matrix and the keyboard matrix which are shown as enclosed within dotted boxes numbered 10 and 20 to correspond with the similar numbered blocks of Fig. 1. Digit conversion matrix 10 generally comprises an electric matrix having nine horizontally spaced input lines interconnected by suitable conducting elements 37, which may comprise rectifiers, diodes or neon glow tubes in a predetermined arrangement with four vertically disposed output lines 11, 12, 13, and 14, whereby each of these nine input lines is connected to a different one or ones of the four output lines for generating the binary-coded form of a different decimal digit. Considering the connection of the line 9, for example, conducting devices 37 convey pulses received over line 9 to output lines 11 and 14. Consequently, for any pulse received over line 9, the binary-coded form of decimal digit 9 (1001) is generated by the output of this matrix. Similarly, each of the other lines numbered 1 through 8, inclusive, are connected to various ones of the four output lines 11, 12, 13, and 14 for generating the binary-coded forms of any of the decimal digits 1–8 in response to energization of a correspondingly numbered input line.

Keyboard matrix 20 comprises a plurality of columns of switches generally labeled *a, b, c, d,* and *e,* each column having nine switches corresponding to each of the decimal digits 1 through 9. One terminal of the switches of each column are connected in common with a different one of each of the control lines, and the other terminals thereof are individually connected to a different one of the nine input lines leading into digit conversion matrix 10. Closure of any one of the nine switches in each column electrically connects the control line associated with that row of keys with the input line of digit conversion matrix 10 corresponding to the decimal number of the key depressed. For example, closure of switch numbered 9 in column *a* of the keyboard matrix, connects control line 15 to line 9 of the digit conversion matrix; similarly, closure of switch 4 of the column *b* interconnects control line 16 with digit conversion matrix input line 4, and so forth.

Thus, the combination of keyboard matrix 20 and digit conversion matrix 10 provides the means for individually generating the binary-coded form of each digit of a multi-digit number that has been stored in the keyboard matrix 20 in response to energization of the control line associated with that denominational order.

These binary-coded pulses generated by digit conversion matrix 10 are thereafter directed over lines 11, 12, 13, and 14 to enter the first four stages 38, 39, 40, and 41 of shifting accumulator 26, as discussed above, and the resulting binary number standing in the accumulator may thereafter be ordinally shifted as desired one stage to the left by each pulse received over shift line 27.

As discussed above, accumulator 26 may be basically comprised of a plurality of identical binary summing stages in cascaded connection, each stage adapted to count two pulses and after receiving the second consecutive pulse to generate a carry-over pulse to the next succeeding stage. For summing these pulses, each stage preferably includes a two-step on-off flip-flop adding circuit such as an Eccles-Jordan connected vacuum tube circuit or the like (not shown) adapted to alternately conduct in response to consecutive input pulses applied to their control grids. For shifting the count stored in each stage to the next succeeding stage on the left in response to each pulse received over the shift line 27, vacuum tube circuitry, as known in the art, is supplied to intermittently connect the various stages responsively to impulses over lines 27, and to transfer a pulse to the succeeding stage on the left only when the preceding stage is in the one conducting condition. A further discussion of the details of such shifting accumulators is, however, believed unnecessary since such circuits are known in the computing arts and the particular circuitry employed is not essential for an understanding of the present invention. For further details of one preferred shifting accumulator that may be employed in the present invention, reference is made to Patent No. 2,666,575, granted on January 19, 1954.

The remaining functions performed by the accumulator such as indicating the resulting binary number standing in the stages upon the completion of operations and clearing the count stored therein to permit a new series of operations are also well known in the art. Indicating the count may be performed by connecting neon light indicators to one of the Eccles-Jordan connected tubes in each stage; these indicators being illuminated when the stage is in the one (1) or conducting condition. Alternatively, the binary number standing in the stages may be transferred or cleared to a storage register 42, as generally illustrated in block diagram form, or to a printing mechanism (not shown) if desired.

For clearing all stages to the zero condition after the completion of all operations and transferring the count of each stage to such a storage register, an impulse may be transmitted over line 43 and directed to each stage of shifting accumulator 26. This impulse operates to return each stage to the zero or nonconducting condition and at the same time enables each stage which has been flipped from the one to the zero condition to generate an impulse to the corresponding stage of the storage register. Such storage registers, as known in the art, may also comprise a plurality of binary counting stages in cascaded connection such as is shown by Patent 2,666,575, each stage connected to a corresponding stage of the shifting accumulator 26. The storage register additionally being responsive to impulses over line 44 to transfer the count to other portions of the system in the same manner as performed by clearing the shifting accumulator by impulses over line 43, discussed above.

To insure that extraneous or spurious pulses are not received over control lines 15, 16, 17, 18, and 19, and thereby allowed to pass through the keyboard matrix and digit conversion matrix to enter accumulator 26, oneway gating circuits 45, 46, 47, 48, and 49 may be placed in each of these control lines. Such gates as well known in the art may comprise vacuum tubes biased to conduct and transmit impulses from the plate circuit thereof only upon receiving a pulse of sufficiently large amplitude. In this manner the radix converter is protected against change in line voltage or a change in tube characteristics that may otherwise result in a false count being entered into the accumulator.

*Programming circuitry Fig. 3*

The programming circuitry of the present invention may most descriptively be termed the timing circuitry or the time sequence controlling circuitry, for this circuitry provides the means for generating the electrical impulses that both initiate the individual conversion of each digit into its binary-coded form, and additionally initiate the shifting of these binary-coded digits to their proper position in the accumulator. In addition, after the completion of these conversion operations and shifting operations, this circuitry provides an impulse for returning all circuits to their initial condition, and preparing the system for a new conversion operation.

For generating these different sequences of pulses, the programming circuit is energized by a pulse source, generally indicated by the box numbered 28 in the lower central portion of the figure, propagating a continuous supply of recuring pulses through an electrical gating member enclosed within a dotted box numbered 29 to a frequency divider circuit 30, and thence to a programming matrix circuit 31. Frequency divider 30, preferably including a plurality of cascaded binary frequency dividing stages 50, 51, 52, 53, and 54, provides the means for receiving each of the incoming pulses from source 28 and separating each of these incoming pulses into a different code of potentials on the output lines of the flip-flop stages. The output potentials of each of these flip-flop stages thence energize the ten vertical input lines of the programming matrix 31 resulting in the thirty-one horizontal output lines of this matrix being consecutively energized one at a time in response to each succeeding impulse entering the input stage of the frequency divider 30. As shown, these output lines are preferably connected to predetermined ones of these input lines by diodes or resistors or the like.

For example, prior to receiving the first impulse from impulse source 28, output line 55 of flip-flop 50 has a more positive potential than output line 56, and similarly output line 58 of flip-flop 51 is more positive than output line 57, output line 60 of flip-flop 52 is more positive than line 59, output line 62 of flip-flop 53 is more positive than line 61, and output line 64 of flip-flop 54 is more positive than line 63. Following the connections of these vertical output lines through the matrix, it is observed that in this instance, only the uppermost horizontal line of the matrix labeled time $t_0$ is connected to all five of these more positive output lines, whereas every other horizontal line of matrix 31 is connected to one of the more negative lines leading from frequency divider 30. Consequently, only line $t_0$ is rendered positive. Upon receiving the second impulse from pulse source 28, the first flip-flop stage 50 of frequency divider 30 changes its conducting condition resulting in output line 56 thereof being more positive than line 55. Following the connections of these vertical lines again, it is observed that in this instance, the second uppermost horizontal line, labeled time $t_1$, of matrix 31 is now the only line now connected to all five positive lines leading from frequency divider 30. Consequently, matrix output line time $t_1$ may be considered as being energized by the second input pulse from source 28. Similarly, following the connections from frequency divider 30 through the matrix to the output lines thereof, it is observed that for each succeeding pulse received by frequency divider 30, the next succeeding line of matrix 31 is energized by a more positive potential, and therefore this combination of frequency divider 30 and matrix 31 in effect diverts each pulse from pulse source 21 over a different output line of matrix 31, resulting in each succeeding output line thereof being energized in time succession by the pulses from source 28.

Having these separate output lines individually energized at succeeding time intervals, any desired time sequences of pulses may be readily taken from matrix 31 by merely connecting a common line to bridge any series of these output lines. For example, as discussed above, it is desired to generate pulses at times $t_0$, $t_4$, $t_6$, $t_9$, $t_{20}$ over control line 15. This may be performed by merely connecting this control line to the first, fifth, seventh, tenth, and twenty-first horizontal lines of matrix 31, as shown. Similarly, as discussed above, since it is desired to transmit pulses over line 16 at times $t_7$, $t_{10}$, $t_{12}$, $t_{14}$, $t_{17}$, and $t_{22}$, line 16 may be connected to the eighth, eleventh, thirteenth, fifteenth, eighteenth and twenty-third horizontal output lines of matrix 31, as shown. Thus, each of the control lines 15, 16, 17, 18, and 19, and the control shift line 27 may be energized to transmit any desired sequence of time separated pulses by connecting each of these lines to the correspondingly numbered output line of matrix 31.

For providing sharp-edged pulses over these control lines, time displaced pulses from a second pulse source 32 may be coincidently combined with the matrix output pulses by directing these secondary pulses through open gate 29 and through summing impedances 65. Each of the summing impedances 65 are connected in circuit with impedances 66, which in turn are individually energized by the potentials across the selected ones of the matrix output lines. Hence, when the potentials across a given one of the impedances 66 is sufficiently positive, a coincidently received impulse from source 32 is directed through the corresponding summing impedance 65, combined with this more positive potential, and permitted to pass through the associated biased rectifying element *67a* to the desired control line.

Referring to the time sequence chart, Fig. 4, for an illustration of these events occurring at time $t_4$, it is noted that at this time instant the bridge line connected to the fifth uppermost matrix output line receives its most positive potential, and this potential remains until the fifth pulse from source 28 energizes frequency divider 30. However, upon the next succeeding impulse from the time displaced source 32 being received through summing impedance 65, the added potentials of this more positive line and this latter impulse through summing impedance 66 exceed the rectifier biasing potential E, enabling a sharp-edged pulse to be propagated through the rectifier 66a to control line 15.

*Second embodiment—Figs. 5 and 6*

Rather than individually entering each of the binary-coded digits into the first four stages of a shifting accumulator and thereafter bodily shifting these digits to the desired ordinal positions in the accumulator, as depicted by Fig. 1, these binary-coded digits may be individually generated, as before, but ordinally shifted prior to being entered into the accumulator, and thereafter directly entered into the correct ordinal positions in a non-shifting accumulator.

Referring to the block diagram at Fig. 5 for an understanding of one preferred embodiment of this latter operating system, the individual digits of the decimal number are again entered and stored in a keyboard matrix 20 by depressing the appropriate keys thereof. Thereafter start switch 34 is closed commencing the energization of a programming matrix 68, preferably of the same type as shown by Fig. 3. Energizing this program matrix again propagates a predetermined time sequence of impulses through the gating means, as shown, to individually energize each of the control lines 15, 16, 17, 18, and 19, as before, resulting in impulses being directed to the proper input lines of the digit conversion matrix unit 10 for individually generating the binary-coded forms A, B, C, D, and E of each of the decimal digits *a*, *b*, *c*, *d*, and *e*, that had been previously stored in the keyboard. These binary-coded impulses transmitted by matrix 10 over output lines 11, 12, 13, and 14 are thence directed to a shifting network or shift matrix, generally designated 69, which adjusts their column-wise position and finally transmits the shifted signals to the desired stages of a non-shifting accumulator, generally designated **70*i*–70*y***, inclusive.

As shown by Fig. 6, the shift matrix circuitry, generally enclosed within a dotted box numbered 69, may preferably take the form of a passive network having four vertically disposed input lines for receiving the binary-coded pulses from lines 11, 12, 13, and 14 generated by the digit conversion matrix 10. Interconnecting each of these vertical lines with all of the diagonally arranged output lines 78–94, inclusive, of the matrix leading to the input stages **70*i* through 70*y*, respectively, of non-shifting accumulator 70, are provided coupling impedance such as the resistor 75 and a diode or rectifier 76. Input pulses received over any of the vertical lines 11, 12, 13, and 14, however, are not of sufficiently large amplitude to pass through this impedance and rectifier, and consequently these pulses may not pass through the output lines of the matrix to the stages of the non-shifting accumulator 70. For directing these binary-coded pulses to pass over only given diagonal lines at any one time instant and thereby to direct such pulses to the proper ordinal position within this accumulator 70, a second bank of horizontally disposed shift lines numbered 95 through 106, inclusive, are interconnected with each of these vertical input lines and each of these diagonal output lines through a second impedance, such as the resistor 77**.

Energizing any one of these series of horizontal shift lines, therefore, permits the impulses from the vertical lines to be directed through only a given series of the horizontal output line. For example, assuming that uppermost horizontal line 95 is energized by an impulse, an impulse coincidently transmitted over vertical line 11 is conducted downwardly to energize each of its related impedances 75. However, the only energized impedance 77 associated with this line is connected to the uppermost horizontal line 95. Consequently, this impulse over line 11 is directed through only the uppermost impedance 75 and rectifier 76 to the uppermost diagonal line 78 and thence to stage **70*y* of non-shifting accumulator 70. Similarly, binary-coded impulses over vertical lines 12, 13, and 14 are controlled by this shift pulse over line 95 to enter the lesser preceding three stages 70*x*, 70*w*, and 70v, in this instance. Should horizontal shift line 99 be energized by a pulse from programming matrix 68, the next succeeding pulse coincidently received over vertical input line 11 is therefore directed only to stage 70*s* of non-shifting accumulator 70, and likewise pulses over the remaining vertical lines 12, 13, and 14 are directed to stages 70*r*, 70*q*, and 70*p*. Thus, it is observed that the binary-coded pulses from digit conversion matrix 10 may be individually shifted to any four successive stages of non-shifting accumulator 70 by coincidently supplying a shift controlling pulse over the corresponding horizontal shift line leading from program matrix 68**.

As discussed above in relation to Fig. 3, any desired sequence of pulses may be taken from the thirty-one output lines leading from program matrix 31 by merely connecting a bridging line to any one or ones of these thirty-one lines. Thus, uppermost shift line 95 of shift matrix 69 may receive an impulse at time $t_0$, as shown, by in Fig. 3, and similarly all of the remaining shift lines merely connecting this line to the matrix output line $t_0$ may be energized at the time instants indicated in the figure, by merely connecting these shift lines to the correspondingly designated output lines of matrix 31.

To eliminate the possibility of extraneous pulses being generated over these shift lines, these lines are preferably connected to the corresponding lines of program matrix 31 in the same manner as are control lines 15, 16, 17, 18, and 19; that is, through a series of mixing circuits (not shown) that are similar to the mixing circuits 65, 66, and 67 of Fig. 3.

For an understanding of the manner and time sequence of shifting these binary-coded pulses prior to their being entered into the accumulator in accordance with this second embodiment of the invention, a third operational chart is given below listing in the first four columns thereof the "Time," "Operation," "Action," and "Accumulator Reading" in a manner similar to Chart I.

Referring to this chart and to Fig. 6, it is noted that at time $t_0$, the programming matrix propagates a first impulse over control line 15 and at the same time transmits a second pulse over shift line 95. This first pulse, passing through keyboard 20 and digit conversion matrix 10, results in impulses being generated over matrix lines 11, 12, 13 and 14, representing the binary-coded digits A; and this second pulse shifts these binary-coded impulses to the uppermost four stages **70*y*, 70*x*, 70*w*, and 70*v* of the accumulator, resulting in the binary number A standing in the accumulator. At later time $t_4$ a similar pulse is transmitted over control line 15. However, at this instant a different shift line 96 is coincidently energized, resulting in the binary-coded digit A being shifted to enter a different series of the accumulator stages 70*v*, 70*u*, 70*t*, and 70*s*, resulting in the accumulator reading A00A. Upon completing seventeen of these individual operations as indicated by the tabulated chart, wherein each of the control lines 15, 16, 17, 18, and 19 are coincidently pulsed with various ones of the shift lines 95–106**, inclusive, in a predetermined time sequence, it is observed that the resulting number standing in the accumulator constitutes the desired binary equivalent of the original decimal number.

Although for purposes of simplicity, the above preferred embodiments of the invention have been disclosed as systems for converting a relatively small five place decimal number *a*, *b*, *c*, *d*, and *e*, to its binary form, the

CHART III

| Time | Operation | Action | Accumulator Reading |
|---|---|---|---|
| $t_0$ | Pulse Line 15 and Shift Line 95 | Enter Shifted A | A |
| $t_4$ | Pulse Line 15 and Shift Line 96 | Enter Shifted A | A00A |
| $t_6$ | Pulse Line 15 and Shift Line 97 | Enter Shifted A | A00AA |
| $t_7$ | Pulse Line 16 and Shift Line 97 | Enter Shifted B | A00A(A+B) |
| $t_9$ | Pulse Line 15 and Shift Line 98 | Enter Shifted A | A00A(A+B)A |
| $t_{10}$ | Pulse Line 16 and Shift Line 98 | Enter Shifted B | A00A(A+B)(A+B) |
| $t_{12}$ | Pulse Line 15 and Shift Line 99 | Enter Shifted B | A00A(A+B)(A+B)B |
| $t_{14}$ | Pulse Line 16 and Shift Line 100 | Enter Shifted B | A00A(A+B)(A+B)BB |
| $t_{15}$ | Pulse Line 17 and Shift Line 100 | Enter Shifted C | A00A(A+B)(A+B)B(B+C) |
| $t_{17}$ | Pulse Line 16 and Shift Line 101 | Enter Shifted B | A00A(A+B)(A+B)B(B+C)B |
| $t_{18}$ | Pulse Line 17 and Shift Line 101 | Enter Shifted C | A00A(A+B)(A+B)B(B+C)(B+C) |
| $t_{20}$ | Pulse Line 15 and Shift Line 102 | Enter Shifted A | A00A(A+B)(A+B)B(B+C)(B+C)A |
| $t_{22}$ | Pulse Line 16 and Shift Line 103 | Enter Shifted B | A00A(A+B)(A+B)B(B+C)(B+C)AB |
| $t_{23}$ | Pulse Line 18 and Shift Line 103 | Enter Shifted D | A00A(A+B)(A+B)B(B+C)(B+C)A(B+D) |
| $t_{25}$ | Pulse Line 17 and Shift Line 104 | Enter Shifted C | A00A(A+B)(A+B)B(B+C)(B+C)A(B+D)C |
| $t_{27}$ | Pulse Line 18 and Shift Line 105 | Enter Shifted D | A00A(A+B)(A+B)B(B+C)(B+C)A(B+D)CD |
| $t_{29}$ | Pulse Line 19 and Shift Line 106 | Enter Shifted E | A00A(A+B)(A+B)B(B+C)(B+C)A(B+D)CDE |

capacity of this system, of course, is not limited to any such range of numbers, for by enlarging the capacity of the programming generator by the addition of more frequency dividing stages and a larger program matrix, and by increasing the number of control lines and adding more rows to the keyboard matrix and more cascaded stages to the accumulator, it is obvious that many larger decimal numbers may be readily and substantially instantaneously converted into their binary equivalent form.

For example, applying the introductory mathematical analysis to a six place decimal number *a, b, c, d, e, f,* it may be readily determined that the binary equivalent of this number may be represented as:

$$AA0B00(A+B)(A+B)(A+B+C)(B+C)$$
$$(A+C)(C+D)(A+C+D)B(C+E)DEF$$

In a similar manner, a seven digit decimal number *a, b, c, d, e, f, g,* may be represented in binary form as:

$$AAA(A+B)BAC00(B+C)(A+B+C+D)(C+D)$$
$$(B+D)(A+D+E)(B+D+E)C(D+F)EFG$$

Whereas on the other hand, the binary equivalent form of the smaller four place decimal number *a, b, c, d,* may be represented as:

$$AAA(A+B)(A+B)0(A+C)BCD$$

In converting each of these different order decimal numbers, the digits of each order are again stored in the various banks of a keyboard matrix or other suitable storage means, and a sequence of pulses from an appropriate programming generator again individually converts each of these decimal digits into their binary-coded form and thence operates to shift these various binary-coded digits into the proper stages of the accumulator as determined by the above binary formula.

These and many other variations of the specific circuitry illustrated and described may be readily made by those skilled in the art in accordance with the basic invention herein disclosed without departing from the spirit and scope of this invention, and therefore this invention is to be considered as limited only in accordance with the features thereof as set forth in the claims appended hereto.

What I claim as new and desire to secure by Letters Patent of the United States is:

1. In a decimal to binary number translator a plurality of control lines including one for each order of a multi-digit decimal number to be translated, a converter for generating output pulses corresponding to the binary-coded form of any decimal digit 1–9, inclusive, in response to energization of a corresponding one of nine input lines leading therein, a plurality of switch means for each order control line for selectively connnecting each order control line to any one of said nine converter input lines in accordance with the decimal digit of that order to be converted, an accumulator energized by the output of said converter for additively summing the binary-coded pulses generated thereby, and a programming generator sequentially energizing each of said control lines and said accumulator in a step-by-step predetermined time sequence pattern, whereby pulses are individually directed through said control lines, switch means, and converter to additively enter the accumulator as a series of additive factors whose total sum corresponds to the binary translated form of the multi-digit decimal number.

2. In a decimal to binary number translator a plurality of control lines including one for each order of a multi-digit decimal number to be translated, means for generating signals representative of the binary-coded form of any of the decimal digits 1–9, inclusive, in response to energization of a different one of nine input lines connected thereto, a plurality of switch means for selectively connecting each order control line to any one of said input lines in accordance with the decimal digit of that order to be converted, an accumulator including a plurality of cascaded binary stages energized by the output of said generating means for additively summing said binary-coded signals, and programming means for energizing each of said control lines in a predetermined time sequence pattern, whereby as each order control line is energized the binary-coded form of the digit of that order is additively entered in the accumulator, said programming means additionally energizing said accumulator to control the desired column position of said binary-coded digit entries in the accumulator stages.

3. In a decimal to binary radix converter, means including a plurality of decimal order control lines for individually generating pulses representing the binary-coded form of each digit of a multi-digit decimal number settable therein, an accumulator including a plurality of cascaded binary stages, and programming means energizing said generating means, said programming means also connected to said accumulator for providing an ordinal shift in time sequence thus enabling the individual conversion of each digit of the decimal number into its binary-coded form and the additive entry of the resulting binary-coded pulses in predetermined column order in the accumulator stages, whereby upon completion of said programming sequence the resulting summation in the accumulator constitutes the binary form of said decimal number.

4. In a decimal to binary radix converter means including a plurality of decimal order control lines for selectively storing each decimal digit of a multi-digit decimal number, means responsive to said selecting means and adapted to individually generate the binary-coded form of each digit by a different series of simultaneously generated pulses over different ones of four output lines, an accumulator including a plurality of cascaded binary summing stages, and programming means energizing said generating means, said programming means also connected to said accumulator for providing an ordinal shift in time sequence thus enabling the sequential generation of the binary-coded pulses representing each stored digit and the addition of each such series of simultaneously generated pulses by said accumulator in predetermned column arrangement in the accumulator stages, whereby upon completion of operations the number standing in the accumulator constitutes the binary form of said decimal number.

5. In a decimal to binary number translator a plurality of order control lines including one for each order of a multi-digit decimal number to be translated, a converter for generating output pulses corresponding to the binary-coded form of any decimal digit 1–9, inclusive, in response to energization of a corresponding one of nine input lines leading therein, a plurality of switch means for each order control line for selectively connecting each order control line to one of said nine converter input lines in accordance with the decimal digit of that order to be converted, an accumulator energized by the output of said converter for additively summing the binary-coded pulses generated thereby, and a programming generator sequentially energizing each of said control lines and said accumulator in a step-by-step predetermined time sequence pattern, said programming generator comprising a frequency divider circuit including a plurality of cascaded stages adapted to be energized by a recurring pulse source, a matrix having a plurality of interconnected input lines and output lines, said matrix input lines being individually energized by different stages of said frequency divider to provide a predetermined voltage on a different one of said output lines in response to each pulse received by said frequency divider, and means for connecting said order control lines to different ones of said matrix output lines in accordance with said desired time sequence.

6. In a decimal to binary number translator a plurality of control lines including one for each order of a multi-digit decimal number to be translated, a nine input line-four output line matrix for generating output pulses over said four lines corresponding to the binary-coded form of any decimal digit 1–9, inclusive, in response to energization of a corresponding one of the nine input lines leading therein, a plurality of switch means for each order control line for selectively connecting each order control line to one of said nine converter input lines in accordance with the decimal digit of that order to be converted, an accumulator energized by the output of said converter for additively summing the binary-coded pulses generated thereby, and a programming generator sequentially energizing each of said control lines and said accumulator in a step-by-step predetermined time sequence pattern, said programming generator comprising a frequency divider circuit adapted to be energized by a recurring pulse source and including a plurality of cascaded stages, a matrix having a plurality of interconnected input lines and output lines, said matrix input lines being individually energized by different stages of said frequency divider to provide a predetermined voltage on a different one of said output lines in response to each pulse received by said frequency divider, and means for connecting said order control lines to different ones of said matrix output lines in accordance with said predetermined time sequence pattern.

7. In a decimal to binary number translator a plurality of control lines including one for each order of a multi-digit decimal number to be translated, a first matrix having nine input lines interconnected in predetermined array with four output lines for generating output pulses corresponding to the binary-coded form of any decimal digit 1–9, inclusive, in response to energization of a corresponding one of said nine input lines leading therein, a plurality of banks of switching means in ordinal array, one bank for each order of the decimal number, the switches of each bank having one terminal thereof connected in common with a corresponding order control line and the other terminals thereof individually connected to different ones of said first matrix input lines, a multi-stage accumulator connected to be energized by the output of said first matrix, a frequency divider circuit adapted to be energized by a recurring pulse source and including a plurality of cascaded flip-flop stages, a second matrix having a plurality of interconnected input lines and output lines, said second matrix input lines being individually energized by different stages of said frequency divider to provide a predetermined voltage on a different one of the output lines thereof in response to each pulse received by said frequency divider, and means for connecting said control lines to different ones of said matrix output lines.

8. In a decimal to binary number translator a plurality of control lines including one for each order of a multi-digit decimal number to be translated, a converter for generating output pulses corresponding to the binary-coded form of any decimal digit 1–9, inclusive, in response to energization of a corresponding one of nine input lines leading therein, a plurality of switch means for each order control line for selectively connecting each order control line to one of said nine converter input lines in accordance with the decimal digit of that order to be converted, a multi-stage shifting accumulator having input lines of the first four stages thereof energized by the output of said converter for additively summing the binary-coded pulses generated thereby, and having a shift input line for receiving impulses to ordinally shift the number stored in said accumulator stages, and a programming generator for sequentially energizing each of said order control lines and said accumulator shift line in a predetermined time sequence pattern, whereby pulses are individually directed through said order control lines, switch means, and converter to additively enter the accumulator as a series of binary-coded digits and are individually and collectively shifted in a predetermined manner to be additively registered by the accumulator as a series of factors whose total sum corresponds to the binary translated form of the multi-digit decimal number.

9. A decimal to binary converter comprising a multi-stage binary counter adapted to be energized by a source of voltage pulses, a plurality of mixing circuits adapted to be energized by a second source of voltage pulses out of time phase relation with said first source, a first electric matrix having a plurality of interconnected input and output conductors, said input conductors being energized by different stages of said counter to provide a predetermined voltage on a different one of said output conductors for each different number registered in said counter, a plurality of control lines including one for each order of a multi-digit decimal number to be translated, a converter for generating output pulses corresponding to the binary-coded form of any decimal digit 1–9, inclusive, in response to energization of a corresponding one of nine input lines leading therein, a plurality of switch means for each order control line for selectively connecting each order control line to one of said nine converter input lines in accordance with the decimal digit of that order to be converted, a multi-stage accumulator energized by the output of said converter for additively summing the binary-coded pulses generated thereby, means for connecting said control lines to different ones of said matrix output lines to enable the sequential energization of each said control line in a predetermined time sequence pattern, and means interconnecting each of said mixing circuits with a different one of said control lines for coincidently combining pulses from said second source with the potentials derived from said matrix.

10. In a decimal to binary converter a plurality of control lines including at least one for each order of a multi-digit decimal number to be converted, a translator for generating output pulses corresponding to the binary-coded form of any decimal digit 1–9, inclusive, in response to energization of a corresponding one of nine input lines leading therein, a plurality of switch means for each order control line for selectively connecting each order control line to any one of said nine converter input lines in accordance with the decimal digit of that order to be converted, an ordinal shifting matrix for receiving said binary-coded impulses and adapted to direct said pulses through different output lines thereof, an accumulator having a plurality of stages each energized by a different one of said matrix output lines, and a programming generator sequentially energizing each of said order control lines and said shift matrix in a predetermined sequential time sequence pattern, whereby the binary-coded pulses are individually directed through said control lines, switch means, and matrix shifter to additively enter the accumulator as a series of additive factors whose total sum corresponds to the binary converted form of the multi-digit decimal number.

11. In a decimal to binary converter means responsive to a recurring pulse source over a single input line for generating individual time spaced pulses over a plurality of output lines in a predetermined time sequence, a plurality of control lines including one for each order of a multi-digit number, a converter for generating output pulses corresponding to the binary-coded form of any decimal digit 1–9, inclusive, in response to energization of a corresponding one of nine input lines leading therein, a plurality of switch means for each order control line for selectively connecting each order control line to any one of said nine converter input lines, a multi-stage accumulator energized by the output of said converter for additively summing the binary-coded pulses generated thereby, means for connecting each of said control lines to a different one of said generator output lines, a plurality of mixing circuits adapted to be energized by a second source of voltage pulses out of time phase relation with said first recurring pulse source, and means interconnecting each of said mixing circuits with a different one of said control lines for coincidently combining pulses from said second source with the individual time spaced pulses transmitted by said generating means.

12. In a decimal to binary converter means responsive to a repetitive series of time spaced pulses received over a single input line for generating an equal number of space separated and time separated pulses over a plurality of output lines, wherein pulses generated over one said output line occur at different time instants than pulses over the remaining lines, a plurality of mixing circuits adapted to be energized by a second source of voltage pulses out of time phase relation with said first source, a plurality of control lines including one for each order of a multi-digit number, a converter for generating output pulses corresponding to the binary-coded form of any decimal digit 1–9, inclusive, in response to energization of a corresponding one of nine input lines leading therein, a plurality of switch means for each order control line for selectively connecting each order control line to any one of said nine converter input lines, a multi-stage accumulator energized by the output of said converter for additively summing the binary-coded pulses generated thereby, means connecting each of said control lines to different ones of said generator output lines for enabling the sequential energization of each said control line in a predetermined time sequence pattern, and means interconnecting each of said mixing circuits with a different one of said control lines for coincidently combining pulses from said second source with said generator pulses.

13. In a decimal to binary converter an accumulator including a plurality of cascaded binary stages having shifting means for transferring the count of each stage to a succeeding stage, means responsive to a time recurring pulse source for generating time spaced pulses over a plurality of separate lines, wherein pulses generated over one line occur at different time instants than pulses over other lines, means for energizing said accumulator shift means by the impulses over one of said separate lines, a converter for generating output pulses corresponding to the binary-coded form of any decimal digit 1–9, inclusive, in response to energization of a corresponding one of nine input lines leading therein, means for directing these binary-coded pulses to the first four stages of said multi-stage accumulator, a plurality of switch means for selectively interconnecting given ones of said plurality of separate generator lines to different ones of said nine converter input lines in accordance with the decimal digit of that order to be converted, a plurality of mixing circuits adapted to be energized by a second source of voltage impulses out of time phase relation with said first time recurring pulse source, and means interconnecting each of said mixing circuits with a different one of said plurality of separate generating lines.

14. A decimal to binary converter comprising means responsive to a time recurring pulse source for generating time spaced pulses over a plurality of separate control lines, wherein pulses generated over each said control line occur at different time instants than pulses over the other control lines, a matrix having nine input lines in predetermined circuit connection with four output lines for generating the binary-coded form of a different one of the decimal digits 1–9, inclusive, in response to energization of a different one of said input lines, a plurality of banks of switching means in ordinal array, one bank for each order of the decimal number, the switches of each bank having one terminal thereof connected in common with a corresponding order control line and the other terminals thereof individually connected to different ones of said matrix input lines, a multi-stage accumulator energized by the output of said matrix for additively summing the binary-coded pulses generated thereby, a plurality of mixing circuits adapted to be energized by a second source of voltage pulses out of time phase relation with said first source, and means interconnecting each of said mixing circuits with a different one of said control lines for coincidently combining pulses from said second source with the pulses from said time recurring pulse source.

15. In a decimal to binary converter means responsive to a repetitive series of time spaced pulses received over a single input line for generating an equal number of space separated and time separated pulses over a plurality of control lines, wherein pulses generated over one said control line occur at different time instants than pulses over the remaining lines in a predetermined time sequence, a translator for generating output pulses corresponding to the binary-coded form of any decimal digit 1–9, inclusive, in response to energization of a corresponding one of nine input lines leading therein, a plurality of switch means for each control line for selectively connecting each control line to any one of said nine converter input lines in accordance with the decimal digit of that order to be converted, an ordinal shifting matrix for receiving said binary-coded impulses and adapted to selectively direct said impulses over a plurality of different channels, an accumulator having a plurality of stages each energized by a different one of said matrix channels, and means for additionally energizing said shifting matrix by impulses received over said control lines for shifting each of the binary-coded digits into predetermined stages of the accumulator whereby the total sum of these binary-coded digits corresponds to the binary-converted form of the multi-digit number.

16. In a decimal to binary converter means responsive to a repetitive series of time space pulses received over a single input line for generating an equal number of space separated and time separated pulses over a plurality of control lines, wherein pulses generated over one said control line occur at different time instants than pulses over the remaining lines, a matrix having nine input lines in predetermined circuit connection with four output lines for generating the binary-coded form of a different one of the decimal digits 1–9, inclusive, in response to energization of a different one of said input lines, a plurality of banks of switching means in ordinal array with one bank for each order of the decimal number, the switches of each bank having one terminal thereof connected in common with a different control line and the other terminals thereof individually connected to different ones of said matrix input lines, an ordinal shifting matrix energized by said matrix and given ones of said control lines for receiving said binary-coded impulses and selectively directing said impulses to different banks of ordinally arranged channels responsively to the impulses from said given control lines, and an accumulator having a plurality of cascaded stages consecutively arranged in banks with each bank adapted to be energized by a different bank leading from said shifting matrix.

17. A decimal to binary converter comprising means responsive to a recurring pulse source over a single input for generating individual time space pulses over a plurality of separate output lines connected thereto in any desired time sequence, a plurality of control lines including one for each order of a multi-digit decimal number to be translated, a converter generating output pulses corresponding to the binary-coded form of any decimal digit 1–9, inclusive, in response to energization of a corresponding one of nine input lines leading therein, a plurality of switch means for each order control line for selectively connecting each order control line to one of said nine converter input lines in accordance with the decimal digit of that order to be converted, an accumulator having a plurality of stages each having a separate input line, and an ordinal shifting network for receiving said binary-coded impulses for selectively directing said impulses to different ordinally arranged stages of the accumulator, said shifting network including a plurality of input lines for receiving said binary-coded impulses and including one control line for each of the various ordinal positions of the accumulator adapted to receive the binary-coded impulses, a plurality of mixing circuits interconnecting each control line in common with each of the input lines, all of said mixing circuits interconnecting any given one of the control lines being connected to a different consecutive series of accumulator stages, and means for transmitting a given time sequence of pulses to said control lines whereby said binary-coded pulses are individually directed through said shift network to additively enter the accumulator stages as a series of factors whose total sum corresponds to the binary converted form of the multi-digit number.

References Cited in the file of this patent

UNITED STATES PATENTS

| | | |
|---|---|---|
| 2,092,412 | Degen | Sept. 7, 1937 |
| 2,411,540 | Haigh | Nov. 26, 1946 |
| 2,444,042 | Hartley et al. | June 29, 1948 |
| 2,575,916 | Hobbs | Nov. 20, 1951 |
| 2,590,950 | Eckert et al. | Apr. 1, 1952 |
| 2,636,133 | Hussey | Apr. 21, 1953 |
| 2,657,856 | Edwards | Nov. 3, 1953 |
| 2,685,039 | Scarbrough et al. | July 27, 1954 |
| 2,729,811 | Gloess | Jan. 3, 1956 |
| 2,792,987 | Stibitz | May 21, 1957 |

OTHER REFERENCES

Electronic Engineering, October 1953, pp. 407–410.